United States Patent [19]

Drexhage

[11] 3,731,222

[45] May 1, 1973

[54] PHENOXAZINE DYE LASERS

[75] Inventor: Karl H. Drexhage, Rochester, N.Y.

[73] Assignee: Eastman Kodak Company, Rochester, N.Y.

[22] Filed: Mar. 30, 1972

[21] Appl. No.: 239,775

[52] U.S. Cl................................331/94.5, 330/4.3
[51] Int. Cl..............................................H01s 3/20
[58] Field of Search .....................331/94.5; 330/4.3; 252/301.2, 301.3

[56] References Cited

UNITED STATES PATENTS 3,679,995  7/1972  Sorokin..............................331/94.5
3,684,979  8/1972  Myer et al...........................331/94.5

OTHER PUBLICATIONS

Capelle et al., Tuned Nitrogen Laser Pumped Dye Laser. Appl. Optics, Vol. 9, No. 12 (December 1970) pp. 2742–2745

Marling et al., Effect of Oxygen on Flashlamp–Pumped Organic–Dye Lasers. IEEE J. Quant. Elect. (September 1970) pp. 570–572.

Primary Examiner—William L. Sikes
Attorney—Robert W. Hampton et al.

[57] ABSTRACT

Phenoxazine dyes are useful as laser dyes. These dyes are used in solution with a non-interfering solvent to form lasing media useful in dye lasers. Such lasers generally include a reservoir for containing the laser dye solution and a pumping energy source operably associated therewith for producing stimulated emission of the laser dye solution.

12 Claims, No Drawings

PHENOXAZINE DYE LASERS

BACKGROUND OF INVENTION

1. Field of Invention

This invention relates to lasers and more particularly to the use of a certain class of dyes as lasing media for organic dye lasers.

2. Description of the Prior Art

Many of the materials discovered thus far which are capable of acting as lasing media have been in the solid or gaseous state. Solid lasers typically suffer from such disadvantages as cracking and optical imperfections. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al, IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, located heating which can cause refractive discontinuities and potential breakdown of the dye is effectively prevented. To provide an energy source for exciting the atoms of the laser material, the laser body can be surrounded concentrically by a lamp, such as one containing an annular region with an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^o$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^o$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S^o$, non-radiatively from $S^1$ to a triplet state and then radiatively or non-radiatively from the lowest excited triplet state to $S^o$. Generally, laser emission consists of optical emission resulting from transitions from $S^1$ to various vibrational modes of $S^o$. Susceptibility to triplet formation upon pumping is deleterious due to typical non-radiative energy losses resulting from triplet to $S^o$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one end and out of the cavity to constitute the laser output light pulse of the laser beam.

As mentioned previously, organic dye lasers have many advantages over solid and gas lasers. However, depending upon the wavelength of lasing desired, one must choose entirely different classes of dyes to obtain the appropriate result. For example, coumarin dyes such as umbelliferone are useful in the short wavelength region, fluorescein is useful in the medium wavelength region and rhodamines such as Rhodamine 6G are useful in the longer wavelength region as are long chain cyanine dyes such as 3,3′diethylthiatricarbocyanine iodide.

From a synthesis standpoint, it can be readily appreciated that generally, it is less expensive to manufacture various members of a single class of dyes than to manufacture several distinct classes of dyes in order to obtain the desired wavelengths of lasing. Accordingly, there is a need in the art for a class of dyes which by minor alterations thereof can be made to lase across a range of wavelengths including portions of the visible spectrum.

SUMMARY OF THE INVENTION

We have found that a class of phenoxazine dyes are useful as lasing media in liquid dye lasers. This class of dyes includes various individual dyes which, upon stimulated emission, have differing wavelengths of lasing. Thus, minor modifications of the basic class of dyes allows one to form dye lasers which will emit at certain preselected wavelength regions.

In dye laser apparatus, the lasing medium can be changed readily merely by removing the dye solution from the lasing cavity, cleaning the cavity and adding a new dye solution. This ease of interchange of dyes allows for great flexibility in the apparatus in that one can readily select the desired wavelength of lasing.

DESCRIPTION OF PREFERRED EMBODIMENTS

The objects of the present invention are obtained through the use, with dye lasers having a reservoir means containing a laser dye solution and a pumping energy source capable of producing stimulated emission of the solution which comprises a lasing concentration of dye in a non-interfering solvent (i.e., one that does not inhibit stimulated emission), of a phenoxazine dye.

The dyes useful in this invention are phenoxazine dyes which can contain the amidinium-ion, carboxyl-ion or amidic chromophoric systems as described, for example, in *The Theory of the Photographic Process*, Mees and James, Third Edition, 1967. In addition, these dyes can contain the sulfur or selenium analogs of the latter two chromophoric systems wherein sulfur and/or selenium replace the oxygen atom(s). Such useful dyes can be designated by the following structural formulas which, for convenience, are used as representative of the various resonating structures of the dyes as well as the 10-oxide thereof:

I. 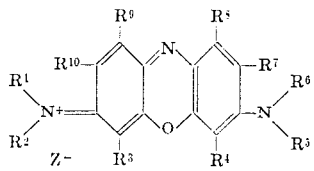

II. 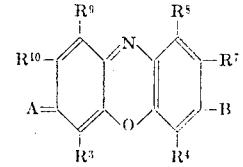

wherein:
$R^1$, $R^2$, $R^5$ and $R^6$ each represent a hydrogen atom; a lower alkyl radical having one to about six carbon atoms and including substituted alkyl radicals having such solubilizing substituents as $-SO_3H$, $-COOH$, etc; a lower alkoxy radical having 1 to about 6 carbon atoms in the alkyl moiety; and $R^1$ and $R^{10}$, $R^2$ and $R^3$, $R^5$ and $R^4$ or $R^6$ and $R^7$, when taken together, represent the carbon atoms necessary to complete a fused 5-, 6- or 7-membered heterocyclic ring;

$R^3$ and $R^4$, when taken along, each represent a hydrogen atom;

$R^7$, $R^8$, $R^9$ and $R^{10}$ each represent a hydrogen atom; a lower alkyl radical having one to about six carbon atoms; a lower alkoxy radical having one to about six carbon atoms in the alkyl moiety; an aryl group such as phenyl, etc; a halogen atom, e.g., chlorine, fluorine, etc; and $R^7$ and $R^8$ or $R^9$ and $R^{10}$, when taken together, represent the carbon atoms necessary to complete a fused 6-membered aromatic ring;

$Z^-$ represents an anion such as chloride, bromide, iodide, perchlorate, sulfate and the like;

A represents an atom selected from oxygen, sulfur or selenium; and

B represents a hydroxy radical; a thiol radical (e.g., $-SH$); a selenol radical (e.g., $-SeH$) or an amine radical of the formula

where $R^5$ and $R^6$ are defined as above.

Especially useful, from the standpoint of availability and ease of synthesis are dyes of Formulas I and II above wherein A is an oxygen atom and B is an oxygen atom or an amine radical as described above.

The dyes described herein can be prepared by various techniques. For example, such dyes having an amidinium-ion chromophoric system can be prepared by the techniques described in *Chem. Ber.*, Vol. 36, p. 479, (1903) or *Chem. Ber.*, Vol. 102, p. 3603, (1969). Those dyes having an amidic chromophoric system can be prepared by techniques as described, for example, in *Chem. Ber.*, Vol. 25, p. 106, (1892). Various dyes having a carboxyl-ion chromophoric system are commercially available such as Compound Nos. P2106 and P2113 of the Eastman Organic Chemicals catalog No. 46.

As used herein, the term "lasting concentration" refers to a concentration sufficient to promote, under appropriate conditions such as those mentioned herein, stimulated emission of the laser dye solution. Generally, concentrations of from about $10^{-1}$ to $10^{-6}$ molar are employed, with solutions of from $10^{-2}$ to $10^{-5}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from one to about six carbon atoms and preferably from two to about four carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from one to about four carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, filed June 1, 1971, and entitled LASER MEDIA CONTAINING FLUORINATED ALCOHOLS, also heterocyclic compounds having a nitrogen heteroatom (e.g., pyridine, 2,6-dimethylpyridine, etc), and lower alkyl ketones such as dimethylketone. Of course, combinations of liquids can be used as can other solvents known to be useful in the dye laser art.

The present lasing media can be used in a variety of laser apparatus. A laser structure particularly adapted for testing organic dye liquid laser media is that described by Sorokin et al, *IBM Journal*, (*supra*). For continuous operation, the present lasing media can be used in apparatus of the type described in copending application of S. A. Tuccio and O. G. Peterson, Ser. No. 117,595, filed Feb. 22, 1971 and entitled CW ORGANIC DYE LASER.

The following embodiments are included for a further understanding of the invention. Unless otherwise stated, the excitation source in the following examples is a giant pulse from a 530.0 nm. frequency doubled, neodymium glass laser. The dye lasing medium is placed in a cuvette which is located between two dielectric mirrors which form a nearly hemispherical dye laser cavity. The light from the excitation or pumping source passes through one of the dielectric mirrors into the dye-containing cuvette and along the optical axis of the cavity. A beam splitter is used to sample the output from the excitation source in order to determine the wavelength of lasing.

Embodiment 1

Resorufin or 7-hydroxy-3H-phenoxazin-3-one is mixed in methanol containing alkali to an optical density of about 2.0 at 530 nm. in a 5 cm. dye cuvette. The cuvette is placed between two dielectric mirrors as described above. The dye is found to lase at a wavelength of about 608 nanometers.

Embodiment 2

Embodiment 1 is repeated except that the dye is 9-diethylamino-5-imino-5H-benzo[a]phenoxazine hydrosulfate. The solvent is methanol and the dye lases at about 690 nm.

Embodiment 3

Embodiment 1 is repeated except that the dye is 7-diethylamino-3-(ethylimino)-3H-phenoxazine ethoperchlorate. The solvent is methanol and the dye lases at about 715 nm.

Embodiment 4

Embodiment 1 is repeated except that the dye is Resazurin or 7-hydroxy-3H-phenoxazine-3-one-10-oxide. The dye lases at about 656 nm.

Embodiment 5

Embodiment 1 is repeated except that the dye is 7-dimethylamino-3H-phenoxazine-3-one, the solvent is methanol and the dye lases at about 638 nm.

Embodiment 6

Embodiment 1 is repeated except that the dye is 9-amino-5-imino-5H-benzo[a]phenoxazine hydroperchlorate, the solvent is methanol and the dye lases at about 645 nm.

Embodiment 7

The dye of Embodiment 6 is tested in a simple flashlamp pumped laser system comprised of a 5-inch U-shaped Xenon Flashlamp (PEK Labs) and a 1 microfarad, 10 kilovolt capacitor (Plastic Capacitors, Inc., EP100-105), for storing the flash energy. The dye is mixed to approximately $10^{-4}$ M solution in methanol and the solution is placed in a circulating flow system which includes a 5½ inch long dye cell. The dye cell and the flashlamp are wrapped together with ordinary white paper in the so-called "close-wrapped" configuration. Two plane parallel dielectric mirrors are placed at the ends of the cell to form the laser cavity which has a transmission loss of about 10 percent. The dye is found to lase at about 677 nm.

Embodiment 8

Embodiment 1 is repeated except that the dye is 2,8-dimethyl-7-ethylamino-3-(ethylimino)-3H-phenoxazine hydroperchlorate, the solvent is methanol and the dye lases at about 643 nm.

Embodiment 9

Embodiment 7 is repeated except that the dye used is that of Embodiment 3 in o-dichlorobenzene solvent. Upon flashlamp pumping, the dye is found to lase at about 740 nm. in this solvent.

The invention has been described in detail with particular reference to certain preferred embodiments thereof, but it will be understood that variations and modifications can be effected within spirit and scope of the invention.

I claim:

1. A dye laser comprising a laser dye solution and a pumping energy source operably coupled therewith and capable of producing stimulated emission of the dye solution, said dye solution comprising a lasing concentration in a non-interfering solvent of a dye having a formula as follows:

1.

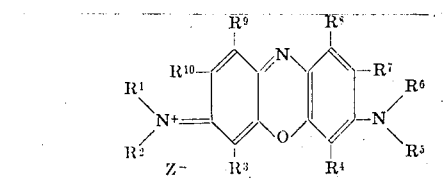

II.

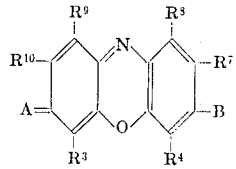

wherein:
R¹, R², R⁵ and R⁶ each represent a member selected from the group consisting of a hydrogen atom; a lower alkyl radical; a lower alkoxy radical; and R¹ and R¹⁰, R² and R³, R⁵ and R⁴ or R⁶ and R⁷, when taken together, represent the carbon atoms necessary to complete a fused 5-, 6- or 7-membered heterocyclic ring;

R³ and R⁴, when taken alone each represents a hydrogen atom;

R⁷, R⁸, R⁹ and R¹⁰ each represent a member selected from the group consisting of a hydrogen atom; a lower alkyl radical; a lower alkoxy radical; an aryl group; a halogen atom; and R⁷ and R⁸ or R⁹ and R¹⁰, when taken together, represent the carbon atoms necessary to complete a fused 6-membered aromatic ring;

Z⁻ represents an anion;

A represents an atom selected from oxygen, sulfur and selenium; and

B represents a member selected from the group consisting of a hydroxy radical; a thiol radical; a selenol radical; and an amine radical.

2. The invention as described in claim 1 wherein said dye is present in a concentration of about $10^{-2}$ to $10^{-6}$ molar.

3. A dye laser comprising a laser dye solution and a pumping energy source operably coupled therewith and capable of producing stimulated emission of the dye solution, said dye solution comprising a lasing concentration, in a non-interfering solvent of a dye having a formula as follows:

I.

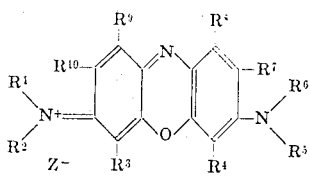

II.

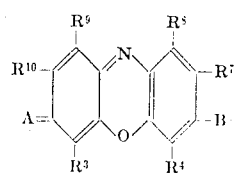

wherein:
R¹, R², R⁵ and R⁶ each represent a member selected from the group consisting of a hydrogen atom, a lower alkyl radical; and a lower alkoxy radical;

R³ and R⁴ each represent a hydrogen atom;

R⁷, R⁸, R⁹ and R¹⁰ each represent a member selected from the group consisting of a hydrogen atom; a lower alkyl radical; a lower alkoxy radical; and R⁷ and R⁸ or R⁹ and R¹⁰, when taken together, represent the carbon atoms necessary to complete a fused 6-membered aromatic ring;

Z⁻ represents an anion;

A represents an oxygen atom; and

B represents a hydroxy radical or an amine radical.

4. A method of producing coherent laser emission in the wavelength range of about 500 to about 800 nm. comprising the step of pumping a dye solution containing between about $10^{-2}$ to about $10^{-6}$ molar concentration of lasing dye in a non-interfering solvent, said dye having a formula as follows:

I.

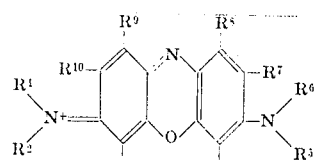

II.

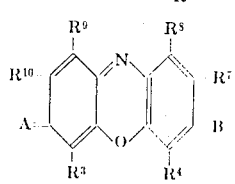

wherein:
R¹, R², R⁵ and R⁶ each represent a member selected from the group consisting of a hydrogen atom, a lower alkyl radical; and a lower alkoxy radical;

R³ and R⁴ each represent a hydrogen atom;

R⁷, R⁸, R⁹ and R¹⁰ each represent a member selected from the group consisting of a hydrogen atom; a lower alkyl radical; a lower alkoxy radical; and R⁷ and R⁸ or R⁹ and R¹⁰, when taken together, represent the carbon atoms necessary to complete a fused 6-membered aromatic ring;

Z⁻ represents an anion;

A represents an oxygen atom; and

B represents a hydroxy radical or an amine radical.

5. The invention as described in claim 4 wherein said dye has the formula:

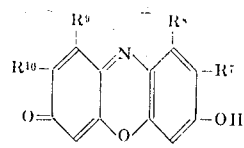

wherein R⁷, R⁸, R⁹ and R¹⁰ are as defined in claim 4.

6. The invention as described in claim 4 wherein said dye has the formula:

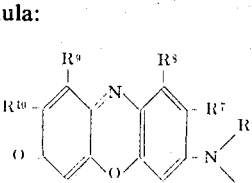

wherein R⁵, R⁶, R⁷, R⁸, R⁹ and R¹⁰ are as defined in claim 4.

7. The invention as described in claim 4 wherein said dye has the formula:

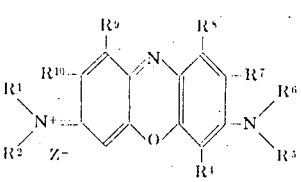

wherein:
- $R^1$, $R^2$, $R^5$, and $R^6$ each represent a hydrogen atom or a lower alkyl radical;
- $R^3$ and $R^4$ each represent a hydrogen atom;
- $R^7$, $R^8$, $R^9$ and $R^{10}$ each represent a hydrogen atom or a lower alkyl radical and $R^7$ and $R^8$ or $R^9$ and $R^{10}$, when taken together, represent the carbon atoms necessary to complete a fused 6-membered aromatic ring; and
- $Z^-$ represents an anion.

8. The invention as described in claim 4 wherein said dye is 7-hydroxy-3H-phenoxazine-3-one or 7-hydroxy-3H-phenoxazine-3-one-10-oxide.

9. The invention as described in claim 4 wherein said dye is a salt of 9-diethylamino-5-imino-5H-benzo[a]phenoxazine.

10. The invention as described in claim 4 wherein said dye is a salt of 7-diethylamino-3-(ethylimino)-3H-phenoxazine.

11. The invention as described in claim 4 wherein said dye is a salt of 9-amino-5-imino-5H-benzo[a]phenoxazine.

12. The invention as described in claim 4 wherein said dye is a salt of 2,8-dimethyl-7-ethylamino-3-(ethylimino)-3H-phenoxazine.

* * * * *